United States Patent
Chang et al.

(10) Patent No.: US 11,950,276 B2
(45) Date of Patent: *Apr. 2, 2024

(54) TRANSMISSION OF PRIORITY INDICATOR BETWEEN ENBS IN A LICENSED FREQUENCY BAND TO MANAGE COMMUNICATION RESOURCES IN AN UNLICENSED FREQUENCY BAND

(71) Applicant: Kyocera Corporation, Kyoto (JP)

(72) Inventors: Henry Chang, San Diego, CA (US); Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 545 days.

This patent is subject to a terminal disclaimer.

(21) Appl. No.: 15/930,202

(22) Filed: May 12, 2020

(65) Prior Publication Data

US 2020/0275456 A1 Aug. 27, 2020

Related U.S. Application Data

(63) Continuation of application No. 15/556,410, filed as application No. PCT/US2016/022689 on Mar. 16, 2016, now Pat. No. 10,694,530.

(60) Provisional application No. 62/137,981, filed on Mar. 25, 2015.

(51) Int. Cl.
*H04W 72/04* (2023.01)
*H04W 16/14* (2009.01)
*H04W 72/56* (2023.01)
*H04W 74/0808* (2024.01)
*H04W 84/12* (2009.01)
*H04W 88/10* (2009.01)

(52) U.S. Cl.
CPC .......... *H04W 72/56* (2023.01); *H04W 16/14* (2013.01); *H04W 74/0808* (2013.01); *H04W 84/12* (2013.01); *H04W 88/10* (2013.01)

(58) Field of Classification Search
None
See application file for complete search history.

(56) References Cited

U.S. PATENT DOCUMENTS

| 8,705,398 | B2* | 4/2014 | Koskela | H04W 72/1284 370/252 |
| 9,369,943 | B2* | 6/2016 | Li | H04L 5/0016 |
| 2006/0063543 | A1* | 3/2006 | Matoba | H04L 1/0009 455/509 |

(Continued)

FOREIGN PATENT DOCUMENTS

WO 2013-155672 A1 10/2013

OTHER PUBLICATIONS

Huawei, HiSilicon; "Coexistence mechanisms among LAA systems"; R1-150044; 3GPP TSG RAN WG1 Meeting #80; Athens, Greece; Feb. 9-13, 2015.

(Continued)

*Primary Examiner* — Duc T Duong

(57) ABSTRACT

An eNodeB transmits a high priority indicator within a licensed frequency band. In response to receiving the high priority indicator, other eNodeBs refrain from transmitting signals within an unlicensed frequency band. After determining that no other eNodeBs are transmitting signals within the unlicensed frequency band, the eNodeB transmitting the high priority indicator transmits signals to a user equipment (UE) device.

3 Claims, 5 Drawing Sheets

(56) References Cited

U.S. PATENT DOCUMENTS

| | | | |
|---|---|---|---|
| 2006/0281404 A1* | 12/2006 | Lee | H04B 7/2606 455/11.1 |
| 2013/0155991 A1 | 6/2013 | Kazmi et al. | |
| 2013/0337821 A1 | 12/2013 | Clegg | |
| 2014/0029535 A1 | 1/2014 | Medapalli | |
| 2014/0185497 A1 | 7/2014 | Wolf et al. | |
| 2014/0307552 A1 | 10/2014 | Elsherif et al. | |
| 2015/0245411 A1 | 8/2015 | Damnjanovic et al. | |
| 2016/0007350 A1 | 1/2016 | Xiong et al. | |
| 2016/0021664 A1 | 1/2016 | Chou | |
| 2016/0037544 A1 | 2/2016 | Wang | |
| 2016/0050667 A1 | 2/2016 | Papasakellariou et al. | |
| 2016/0212625 A1 | 7/2016 | Damnjanovic et al. | |
| 2017/0041950 A1* | 2/2017 | Wang | H04W 48/10 |
| 2017/0118758 A1 | 4/2017 | Li | |
| 2017/0238320 A1 | 8/2017 | Fukuta et al. | |
| 2018/0192365 A1* | 7/2018 | Feng | H04B 17/309 |
| 2019/0132876 A1* | 5/2019 | Shikari | H04L 5/001 |

OTHER PUBLICATIONS

Nokia Networks, Nokia Corporation; "On LTE LAA inter-cell interference management mechanisms"; R1-150456; 3GPP TSG RAN WG1 Meeting #80; Athens, Greece; Feb. 9-13, 2015.

\* cited by examiner

TRANSMISSION OF PRIORITY INDICATOR BETWEEN ENBS IN A LICENSED FREQUENCY BAND TO MANAGE COMMUNICATION RESOURCES IN AN UNLICENSED FREQUENCY BAND

CLAIM OF PRIORITY

The present application is a continuation of U.S. application Ser. No. 15/556,410; filed Sep. 7, 2017 and entitled "TRANSMISSION OF PRIORITY INDICATOR BETWEEN ENBS IN A LICENSED FREQUENCY BAND TO MANAGE COMMUNICATION RESOURCES IN AN UNLICENSED FREQUENCY BAND;" which is a national stage application of PCT/US2016/022689; filed Mar. 16, 2016 and entitled "TRANSMISSION OF PRIORITY INDICATOR BETWEEN ENBS IN A LICENSED FREQUENCY BAND TO MANAGE COMMUNICATION RESOURCES IN AN UNLICENSED FREQUENCY BAND;" which claims priority to Provisional Application No. 62/137,981; filed Mar. 25, 2015 and entitled "LICENSED BAND CARRIER INTER-ENB INFORMATION EXCHANGE RELATED TO THE PRIORITY OF THE UNLICENSED CARRIER RESOURCES;" all of which are assigned to the assignee hereof and hereby expressly incorporated by reference in their entirety.

FIELD

This invention generally relates to wireless communications and more particularly to transmission of a priority indicator between eNBs in a licensed frequency band to manage communication resources in an unlicensed frequency band.

BACKGROUND

The frequency spectrum used by a particular communication system may be licensed or unlicensed. Licensed frequency spectrum (frequency band) is licensed to a system operator by a government agency such as the Federal Communications Commission (FCC). An example of such licensed spectrum includes frequency bands used for cellular communication. An unlicensed frequency band is any portion of frequency spectrum that does not require a license from the government agency to communicate with the unlicensed frequency band. Equipment operating within the unlicensed band, however, typically must adhere to regulations and/or communication standards. An example of unlicensed frequency spectrum includes frequency bands used for Institute of Electrical and Electronics Engineers (IEEE) 802.11 communication.

In some communication system implementations, a base station, such as eNodeB, provides a primary cell (PCell) and a secondary cell (SCell) where the two cells use different frequencies. In some situations, the PCell may use a licensed frequency band and the SCell operates in an unlicensed frequency band.

SUMMARY

An eNodeB transmits a high priority indicator within a licensed frequency band. In response to receiving the high priority indicator, other eNodeBs refrain from transmitting signals within an unlicensed frequency band. After determining that no other eNodeBs are transmitting signals within the unlicensed frequency band, the eNodeB transmitting the high priority indicator transmits signals to a user equipment (UE) device.

DETAILED DESCRIPTION

Figure 1:
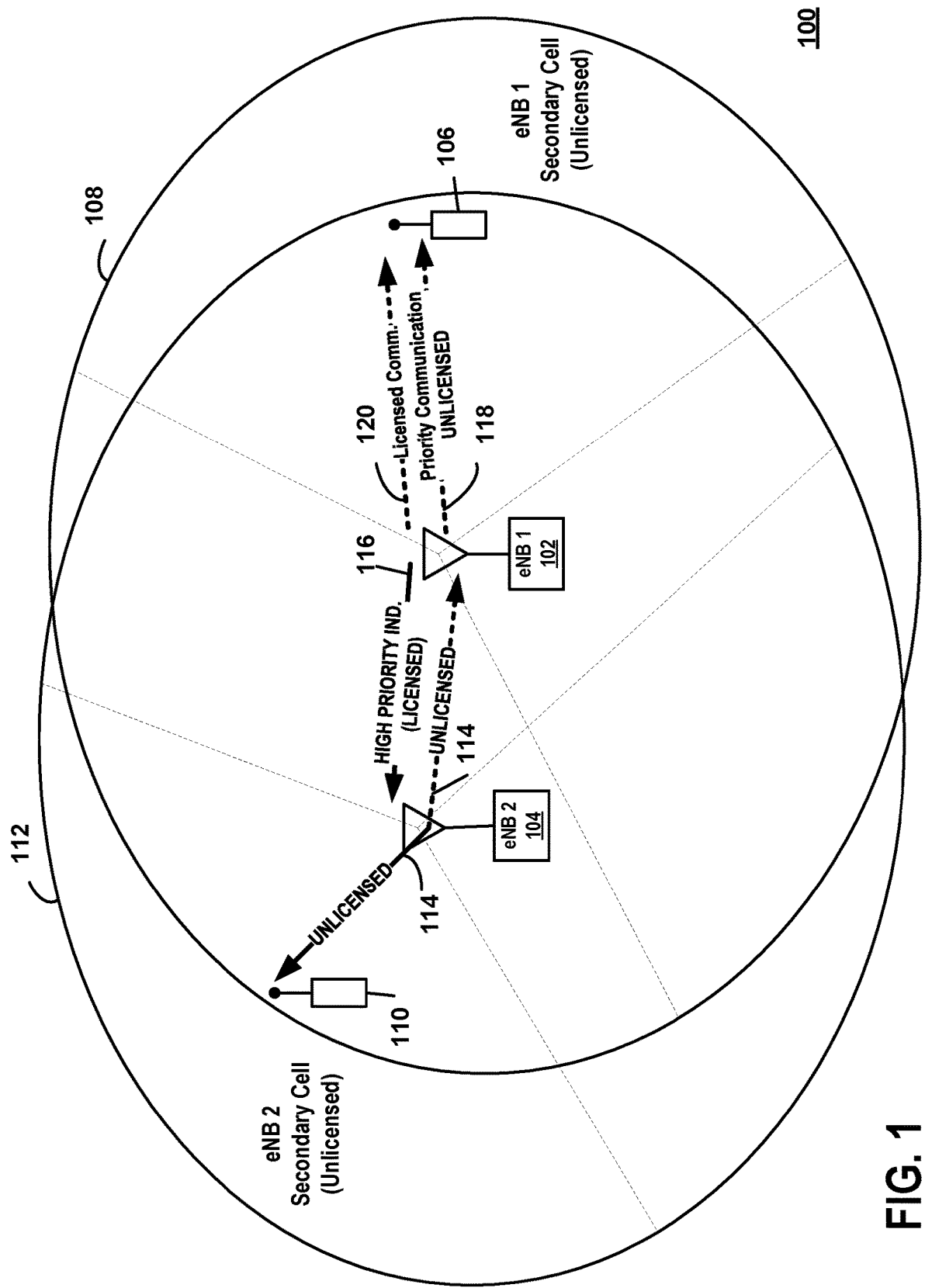
FIG. 1 is a block diagram of a licensed communication system having eNodeBs (eNBs) that provide service using an unlicensed frequency band.

FIG. 1 is a block diagram of a licensed communication system 100 having eNodeBs 102, 104 that provide service using an unlicensed frequency band. A first eNodeB (eNB) 102 provides wireless communication service to one or more user equipment (UE) devices 106 within a first secondary cell (SCell) 108 and a second eNB 104 provides wireless communication service to one or more UE devices 110 within a second SCell 112. The service areas of the SCells at least partially overlap. In some situations, one of the SCells may be completely within the other SCell service area. In addition, there may be several SCells within any other SCell. For the example of FIG. 1, each eNB provides a primary cell (PCell) using a licensed frequency band. The PCells may have the same geographic service area as the SCell of the particular eNB or may have a different geographic service area.

The licensed communication system 100 may be any communication system that uses a portion of frequency spectrum (frequency band) that is licensed to the system operator by a government agency such as the Federal Communications Commission (FCC). For the examples discussed herein, the licensed communication system 100 is a cellular system that operates in accordance with at least one revision of The Third-Generation Partnership Project Long-Term Evolution (3GPP LTE) communication specification. Examples of licensed frequency bands include Advanced Wireless Service (AWS) 4G frequencies in the range of 1,710-1,755 and 2,110-2,155 MHz. The unlicensed frequency band is any portion of frequency spectrum that does not require a license from the government agency to communicate with the unlicensed frequency band. Equipment operating within the unlicensed band, however, typically must adhere to regulations and/or communication standards. Examples of unlicensed bands include frequency bands used for IEEE 802.11 standards that comply with the FCC Rules and Regulations such as WiFi, Bluetooth, and Zigbee.

A cellular communication system is typically required to adhere to a communication standard or specification. The communication specification defines physical channel structure that at least includes a data channel and a control channel for uplink and downlink transmissions and specifies at least some timing and frequency parameters for physical downlink control channels from a base station to a wireless communication device. The Third-Generation Partnership Project Long-Term Evolution (3GPP LTE) communication specification is a specification for systems where communication stations (eNodeBs) provide service to wireless communication devices (UE devices) using orthogonal frequency-division multiple access (OFDMA) on the downlink and single-carrier frequency-division multiple access (SC-FDMA) on the uplink. Although the techniques described herein may be applied in other types of communication systems, the exemplary systems discussed herein operate in accordance with an FDD 3GPP LTE communication specification.

The eNBs 102, 104 can be any type of communication station, transceiver station, or radio head and may be referred to as a base station, eNodeB, fixed station, access point, and other terms. The eNBs 102, 104 may be connected within a network of several other eNBs through a backhaul (not shown in FIG. 1). The UE devices 106, 110 are any type of user devices and are sometimes referred to by other terms such as, for example, handset, phone, smartphone, mobile device, portable device, and modem. Communication using the licensed band may include downlink transmissions from an eNB to UE devices, uplink communication from UE devices to an eNB, and device-to-device (D2D) communication between two or more UE devices.

The licensed communication system communicates in the licensed frequency band using a licensed physical channel structure. The physical channel structure for downlink communication may differ from the physical channel structure for uplink communication. The licensed physical channel structure partitions time and frequency to define a plurality of time-frequency resources (resource elements). Sets of resources are allocated for a particular type of communication. For example, different sets of time-frequency communication resources can be allocated for data, control, and reference signals. For the examples herein, the licensed physical channel structure adheres to at least one revision of the 3GPP LTE communication specification.

As discussed above, the eNBs can provide service to one or more UE devices using the unlicensed frequency band in the SCells. For the examples herein, the licensed communication system 100 uses an unlicensed physical channel structure for communication in the unlicensed frequency band where the unlicensed physical channel structure at least has the same time and frequency divisions as the licensed physical channel structure. Although the frequencies are different, each frequency division in the unlicensed structure corresponds to a frequency division in the licensed structure such that the communication resource elements in the unlicensed structure correlate to the communication resource elements in the licensed structure. A reference set of communication resource elements for transmission of reference signals have the same symbol times as a reference set of resource elements allocated in the licensed physical channel structure for reference signals. Other arrangements may be used in some circumstances. An example of physical channel structure related to licensed and unlicensed communication is discussed in international patent application entitled "Physical Channel Structure For Communication In Unlicensed Frequency Band", international application number PCT/US2015/032279, international publication number WO 2015/179826, filed on May 22, 2015, and incorporated by reference herein.

For the examples herein, the licensed communication system uses the unlicensed frequency band for communication at times determined to avoid interference or at least to result in a tolerable level of interference. When it is determined that unlicensed equipment is operating nearby, the unlicensed frequency band is monitored prior to transmission to determine if the band is currently in use. If it is determined that the band is not in use, the licensed equipment transmits signals within the unlicensed frequency band. The monitoring procedure prior to transmission is the same, or at least similar to the sensing/back off procedures employed by conventional devices operating in the unlicensed frequency band. The techniques may be required by rules or standards governing operation in the unlicensed frequency band.

In the exemplary scenario depicted in FIG. 1, the second eNB is transmitting a signal 114 in the unlicensed frequency band to the UE device 110 in the SCell and the first eNB 102 detects the signal 114. The first eNB 102, however, has a high priority communication 118 pending transmission to the UE device 106 in the SCell 108. In accordance with the techniques herein, the first eNB 102 transmits a high priority indicator 116 within a downlink channel in the licensed frequency band. In response to detecting the high priority indicator 116, the second eNB stops transmission within the SCell 112. After determining that the unlicensed frequency band is no longer in use, the first eNB 102 transmits the high priority communication 118 to the UE device 106 in the SCell 108 using the unlicensed frequency band.

Other techniques can be used to transmit the high priority indicator 116. For example, the high priority indicator 116 can be transmitted over a licensed uplink channel instead of the downlink channel. D2D communication resources may be used for the uplink transmission in some circumstances. In addition, the high priority indicator 116 may be transmitted before the eNB determines that energy is present in the unlicensed frequency band. In other words, the eNB reserves the unlicensed frequency band from other eNB traffic.

Figure 2:
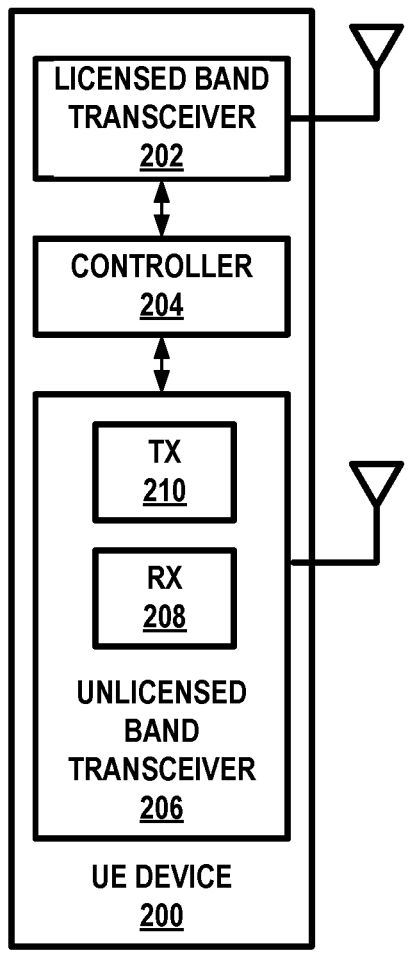
FIG. 2 is a block diagram of an example of a UE device suitable for use as one of the UE devices in FIG. 1.

FIG. 2 is a block diagram of an example of a UE device 200 suitable for use as one of the UE devices 106, 110 in FIG. 1. The UE device 200 includes a licensed band transceiver 202, a controller 204, as well as other components and circuitry (not shown) such as memory, for example. For the examples herein, each UE device also includes an unlicensed band transceiver 206 which includes an unlicensed band receiver 208 and an unlicensed band transmitter 210. The unlicensed band transmitter 210 transmits signals over the unlicensed frequency band where, depending on the situation, the signals may provide uplink control information to the eNB, uplink data information to the eNB, D2D control information to another UE, and/or D2D data information to another UE device. The unlicensed band transmitter 210 may be omitted from the UE device 200. This may be the case where the UE device 200 is used to only monitor the unlicensed band and/or only to receive signals within the unlicensed band. The unlicensed band receiver 208 receives signals over the unlicensed frequency band where, depending on the situation, the signals may provide downlink control information from the eNB, downlink data information from the eNB, D2D control information from another UE, and/or D2D data information from another UE device.

The licensed band transceiver 202 includes a transmitter that transmits uplink wireless signals to eNBs and a receiver that receives downlink wireless signals from the eNBs within the licensed frequency band. The transceiver can also be configured to transmit and receive D2D signals using allocated licensed uplink communication resources. The controller 204 controls components of the UE device 200 to manage the functions of the device 200 described herein as well as to facilitate the overall functionality of the device 200. The controller 204 is connected to the transceivers 202, 208 and other components such as memory.

Figure 3:
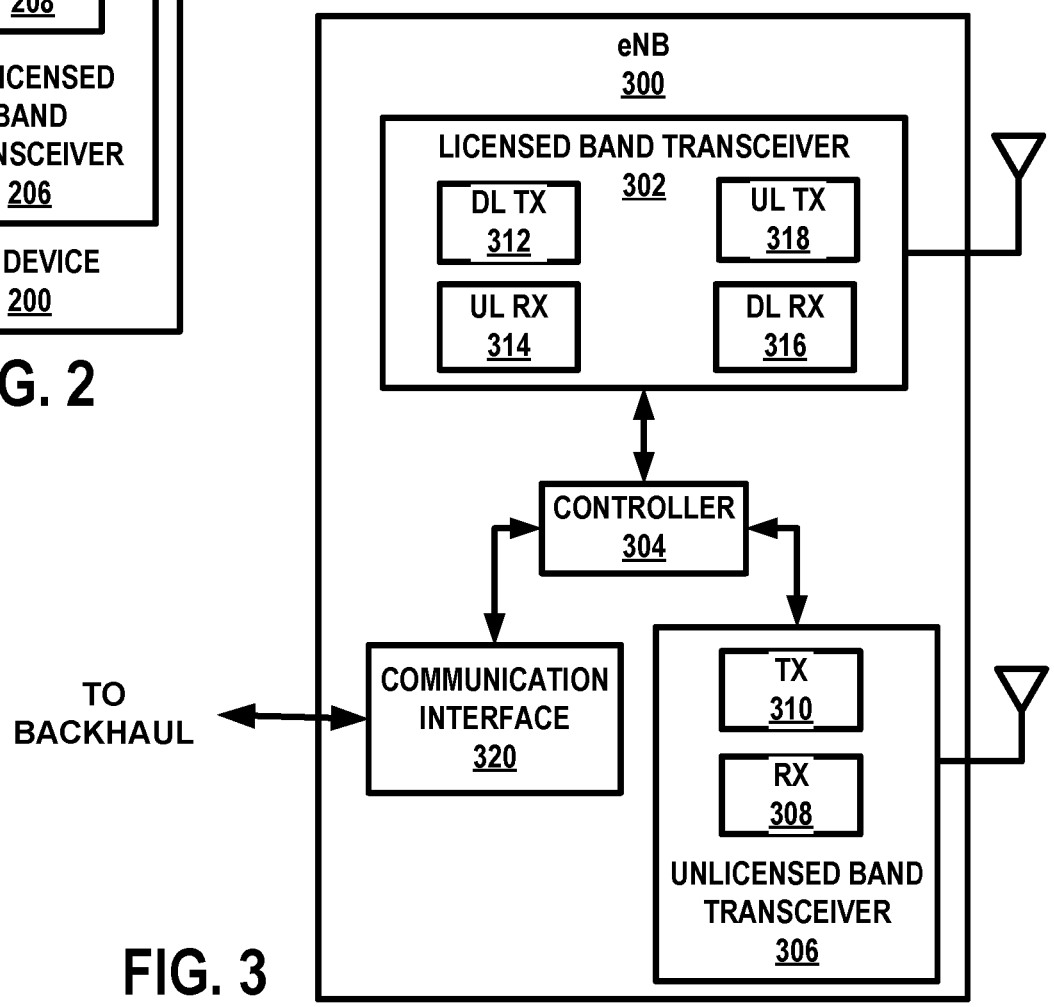
FIG. 3 is a block diagram of an example of an eNB suitable for use as the eNBs in FIG. 1.

FIG. 3 is a block diagram of an example of an eNB 300 suitable for use as the eNBs 102, 104 in FIG. 1. The eNB 300 includes a licensed band transceiver 302, a controller 304, as well as other components and circuitry (not shown) such as memory, for example. For the examples herein, the eNB 300 also includes an unlicensed band transceiver 306 which includes an unlicensed band receiver 308 and an unlicensed band transmitter 310. The unlicensed band transmitter 310 transmits signals over the unlicensed frequency band where, depending on the situation, the signals may provide downlink control information to the UE device and downlink data information to the UE device. The licensed band transceiver 302 exchanges wireless signals with the UE devices 106, 110 within the PCell service area. Transmissions within the licensed band from the eNB and from the UE devices are governed by a communication specification that defines signaling, protocols, and parameters of the transmission with the frequency band licensed to the operator of the licensed system 100. The communication specification may provide strict rules for communication and may also provide general requirements where specific implementations may vary while still adhering to the communication specification. Although the discussion herein is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for physical channels.

The licensed band transceiver 302, therefore, includes at least a downlink transmitter 312 for transmitting downlink signals and an uplink receiver 314 for receiving uplink signals. For the examples herein, the licensed band transceiver 302 also includes a licensed downlink receiver 316 for receiving downlink signals transmitted from other eNBs where such downlink signals at least include high priority indicators 116. As discussed below, eNBs may wirelessly transmit unlicensed frequency band communication resource information in a downlink broadcast message for receipt by other nearby eNBs in addition to the high priority indicators 116. Accordingly, the downlink receiver 316 in the eNB 300 receives downlink signals from other eNBs. As explained above, the high priority indicator 116 may be transmitted over an uplink channel such as a D2D channel in some situations. In systems using an uplink channel for transmission of the high priority indicator 116, each eNB also includes an uplink transmitter 318.

The unlicensed band receiver 308 may be used to sense/monitor the unlicensed frequency band before a transmission in the unlicensed frequency band when the eNB is operating in the sensing mode. For the examples, the controller and the unlicensed band receiver 308 measure one or parameters that indicate the energy level within the unlicensed frequency band. An example of a suitable technique includes determining the received signal strength indicator (RSSI) which is a measurement of the power present in the received radio signal. The RSSI is compared to a threshold. The threshold used by the eNB is typically the same as the threshold used by UE devices although in some circumstances the thresholds may be different. For the examples herein, the eNB detects energy in the unlicensed frequency band and does not make a determination on whether any detected energy is from another eNB or an unlicensed device. In some situations, however, the unlicensed band transceiver may determine whether a detected transmission is from another eNB. For the example, the eNB 300 also includes a communication interface 320 for facilitating communication over the backhaul with other eNBs and network entities. Where X2 signaling is available, the communication interface 320 communicates over the backhaul using X2. In some situations, where the X2 signaling is available between eNBs, the high priority indicator 116 may be transmitted to the other eNB(s) over the backhaul.

Figure 4:
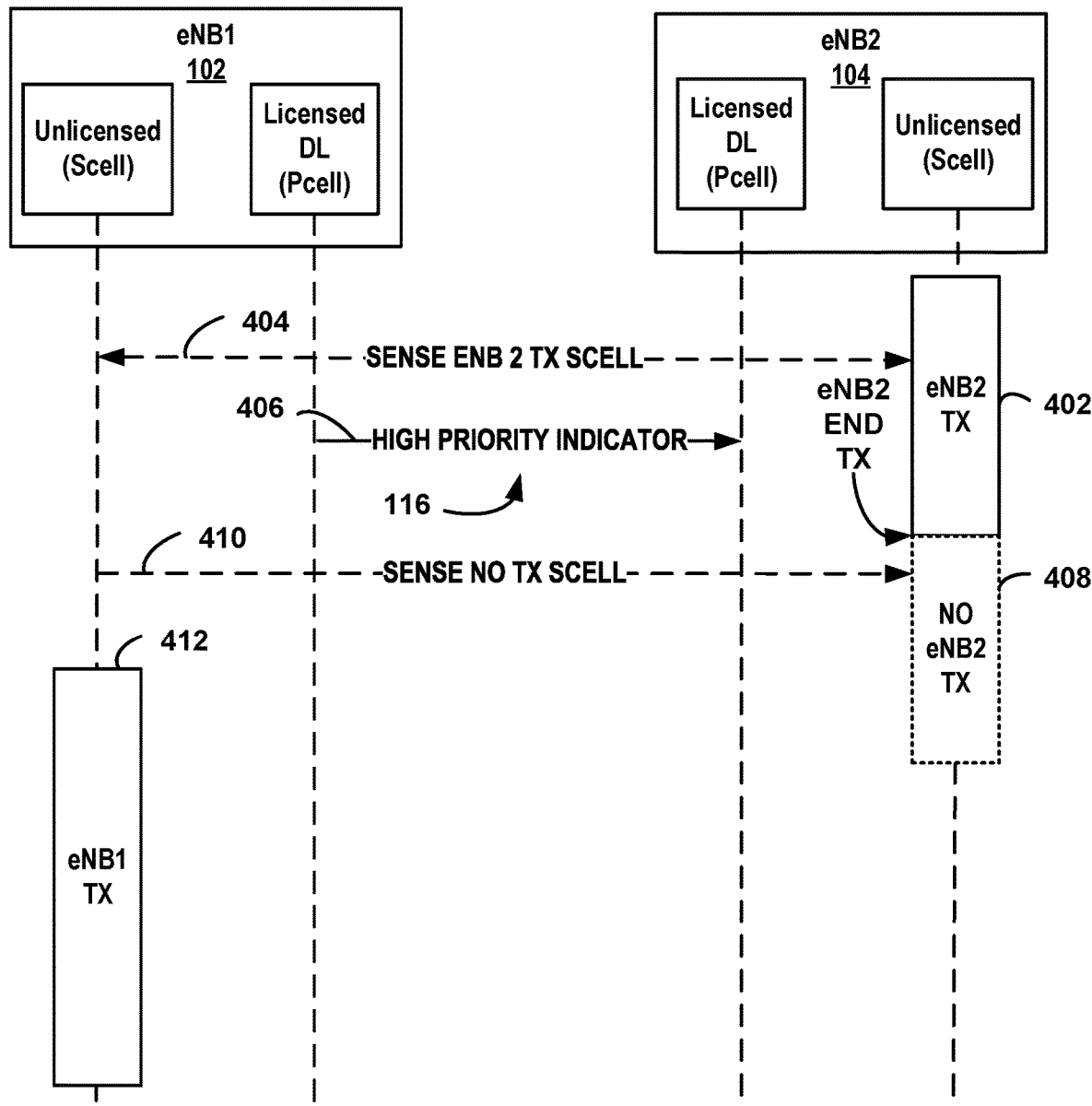
FIG. 4 is an illustration of transmissions between the eNBs for an example where a high priority indicator is sent after detection of transmission by an eNB in the unlicensed frequency band.

FIG. 4 is an illustration of transmissions between the eNBs for an example where a high priority indicator 116 is sent after detection of transmission by an eNB in the unlicensed frequency band. For the example of FIG. 4, transmissions between two eNBs are discussed. In some situations, there may be transmissions between multiple eNBs. For example, the high priority indicator 116 may be broadcast to multiple eNBs in some scenarios.

As discussed above, each eNB 102, 104 provides a PCell in the licensed frequency band and an SCell in the unlicensed band. At transmission 402, the second eNB 104 is transmitting one or more signals within the unlicensed frequency band. During the transmission 402, the first eNB 102 determines that a high priority communication 118 should be transmitted in the unlicensed frequency band. During event 404, the first eNB 102 senses, or otherwise monitors, the unlicensed frequency band to detect the transmission 402 and determine that the second eNB 104 is transmitting within the unlicensed frequency band.

At transmission 406, the first eNB 102 sends a high priority indicator 116 in the licensed frequency band. For the examples of FIG. 4, the high priority indicator transmission 406 is transmitted in a downlink control channel such as a PDCCH in LTE. In some situations, the high priority indicator 116 may be broadcast in a broadcast control signal such as SIB in LTE.

In response to receiving the high priority indicator 116, the second eNB 104, ceases the transmission 402 and refrains from transmitting signals in the unlicensed frequency band. A portion of the intended transmission 408 by the second eNB 104 is illustrated by a dashed-line block to indicate that the transmission 402 has been stopped. As discussed below in further detail, the high priority indicator 116 may include information identifying a particular unlicensed frequency band and channels within the band. The second eNB 104 may use information to only refrain from transmitting signals within the identified band(s) and/or channel(s).

At event 410, the first eNB 102 monitors the unlicensed frequency band (or specific channels within the band) to determine that the second eNB is not transmitting within the unlicensed frequency band. At transmission 412, the first eNB 102 transmits the high priority communication 118 within the unlicensed frequency band.

In one example, the second eNB 104 resumes transmission in the unlicensed frequency band after receiving a message from the first eNB indicating that the ban on transmission has been lifted. In another example, the duration of the transmission ban is indicated in the message providing the high priority indicator 116.

Figure 5:
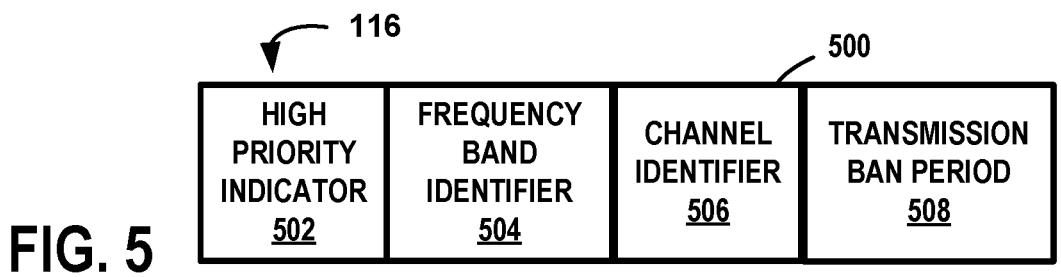
FIG. 5 is a block diagram of an example of a high priority indicator message suitable for transmitting the high priority indicator.

FIG. 5 is a block diagram of an example of a high priority indicator message 500 suitable for transmitting the high priority indicator 116. The high priority indicator message 500 includes at least a high priority indicator portion 502 that conveys the high priority indicator 116. In some situations, the high priority indicator portion 502 may be a one-bit flag within a designated field within the message 500 that conveys to the receiving eNB that the eNB transmitting the message 500 has a high priority communication 118 pending and that transmission in the unlicensed frequency band should be suspended by the eNB receiving the message 500. In other situations, the high priority indicator portion 502 may provide additional information. For example, the high priority indicator portion 502 may indicate a particular priority level out of a several priority levels. Such a scheme may be useful in implementations where a distinction is made between very high priority communication 118, such as emergency communications (E911), and lower priority communications such as delay intolerant messages (e.g., voice).

For the example of FIG. 5, the high priority indicator message 500 includes a frequency band identifier 504 that identifies one or more unlicensed frequency bands. For example, the frequency band identifier 504 may identify a band from the several bands including 2.4 GHz, 5 GHz and 60 GHz unlicensed frequency bands.

A channel identifier 506 in the message 500 identifies the channels or particular carriers within the unlicensed frequency band. The channel identifier 506 may identify channel numbers, for example.

In some situations, the eNB 102 that is transmitting the high priority indicator 116 may also provide a time when the eNB 104 can resume transmission in the unlicensed frequency band. Therefore, in some situations, the high priority indicator message 500 may include a transmission ban duration 508 that indicates to the eNB how long the eNB should refrain from transmitting in the unlicensed frequency band. Further, a start time of the transmission ban may be specified with, for example, a subframe offset. Otherwise, the transmission ban is based on the receipt of the high priority indicator 116.

Some of the information in the message 500 shown in FIG. 5 may be omitted in some situations. For example, as an alternative to sending a transmission ban period 508, the eNB 102 may transmit a message indicating that the eNB 104 can resume transmission in the unlicensed frequency band. Also, the frequency band identifier 504 and/or the channel identifier 506 may be omitted in some circumstances. Accordingly, the high priority indicator message 500 may include any combination of the information identified in FIG. 5 in addition to other information. In some situations, the different information in the message 500 may be sent over more than one transmission.

The high priority indicator message 500 is transmitted in a downlink control channel for the examples herein. In some situations, the high priority indicator message 500 is transmitted within a PDCCH in accordance with LTE standards. For example, a dedicated Radio Network Temporary Identifier (RNTI) can be used such that all eNBs can monitor the dedicated RNTI for a high priority indicator 116. In other situations, the high priority indicator message 500 is transmitted in a broadcast channel allowing all eNBs within range to receive the high priority indicator 116. For example, the high priority indicator message 500 may be transmitted in a SIB message in accordance with LTE standards. As explained above, other channels and techniques can be used to transmit the high priority indicator 116. Examples of other techniques include using the uplink channels, D2D channels and communication through a backhaul such as transmissions using X2 signaling.

Figure 6:
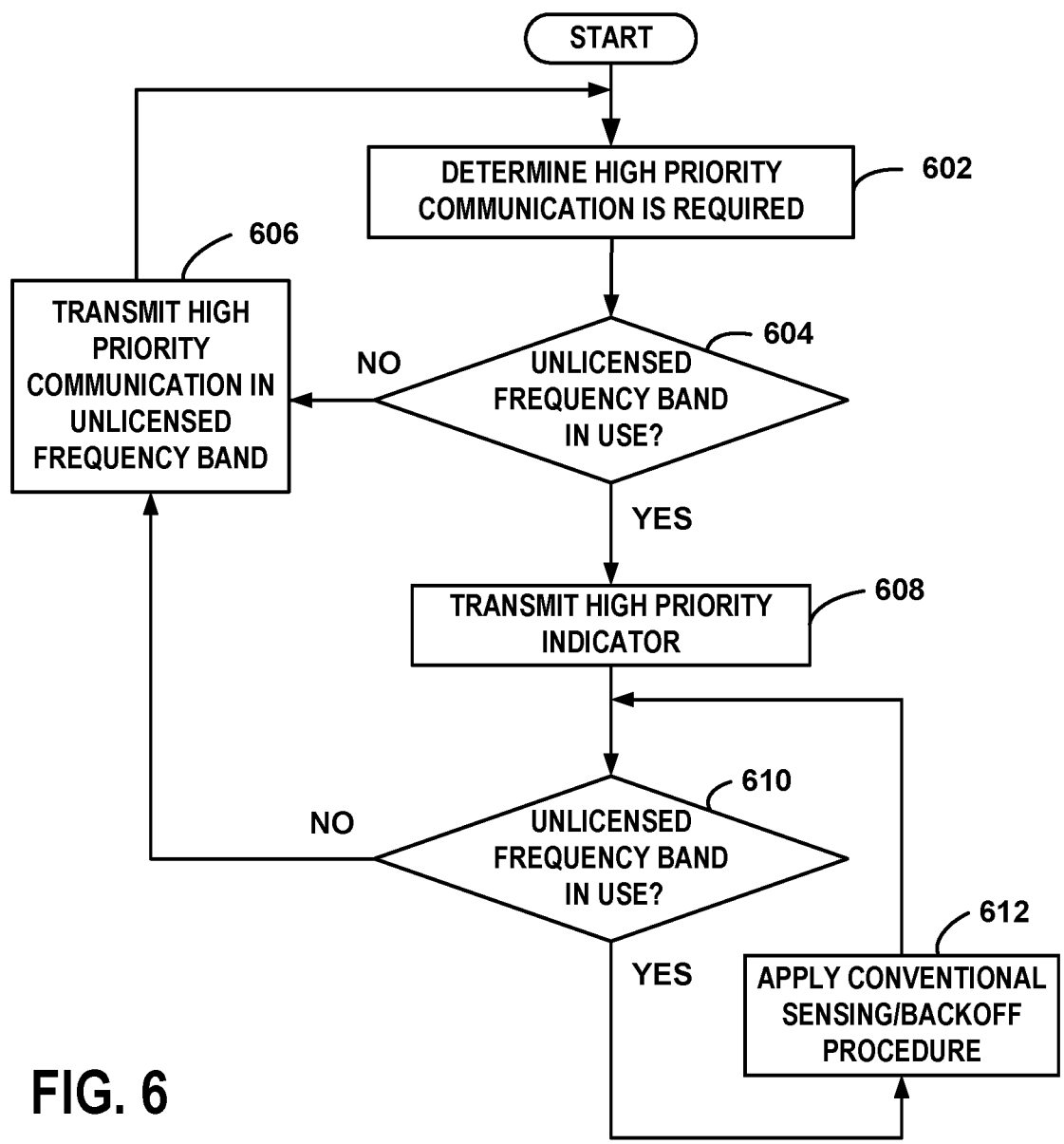
FIG. 6 is a flow chart of a method performed at an eNB for an example where the eNB has a pending high priority communication.

FIG. 6 is a flow chart of a method performed at an eNB for an example where the eNB has a pending high priority communication 118. Therefore, for the example, the method is performed by an eNB such as the first eNB 102 discussed above.

At step 602, the eNB 102 determines that a high priority communication 118 is pending. Such a communication may be an E911 call, for example.

At step 604, the eNB 102 determines whether the unlicensed frequency band is in use. The eNB 102 senses/monitors the unlicensed frequency band to determine whether other devices are transmitting signals within the band. If the unlicensed frequency band is not in use, the method continues at step 606 where the eNB transmits the high priority communication 118 within the unlicensed frequency band. Otherwise, the method proceeds to step 608.

At step 608, the eNB 102 transmits the high priority indicator 116 to at least one other eNB. For the example, the eNB 102 transmits a high priority indicator message 500 in the licensed band downlink control channel. Other wireless and wired channels can be used in some circumstances as discussed above. In some circumstances, the eNB determines whether a high priority indicator 116 has been received from any other eNB and only transmits a high priority indicator 116 if no other high priority indicator has been received.

At step 610, the eNB determines if unlicensed frequency band is in use. The eNB monitors/senses the channel to determine if there is energy above a threshold. If the unlicensed frequency band is not in use, the method continues at step 606 where the high priority communication 118 is transmitted in the unlicensed frequency band. Otherwise, the method continues at step 612. In some circumstances, step 604 can be omitted and the eNB may transmit the high priority indicator 116 in response to determining that a high priority communication 118 is pending transmission. In such situations, therefore, the eNB determines that the message is pending, transmits the high priority indicator 116 and then monitors the unlicensed frequency band at step 610.

At step 612, the eNB senses the unlicensed frequency band and returns to step 610. The eNB, therefore, continues to monitor the unlicensed frequency band until the channel is not in use. When the channel is determined not to be in use the method continues at step 606.

For the example of FIG. 6, the eNB 102 transmits the high priority indicator 116 after detecting transmission by another eNB in the unlicensed frequency band. In other examples, the eNB 102 transmits the high priority indicator message 500 after determining that a high priority communication 118 is pending without monitoring the unlicensed frequency band. The eNB 102 may broadcast the high priority indicator message 500 to all eNBs within range and then monitor the unlicensed channel until it is clear.

Figure 7:
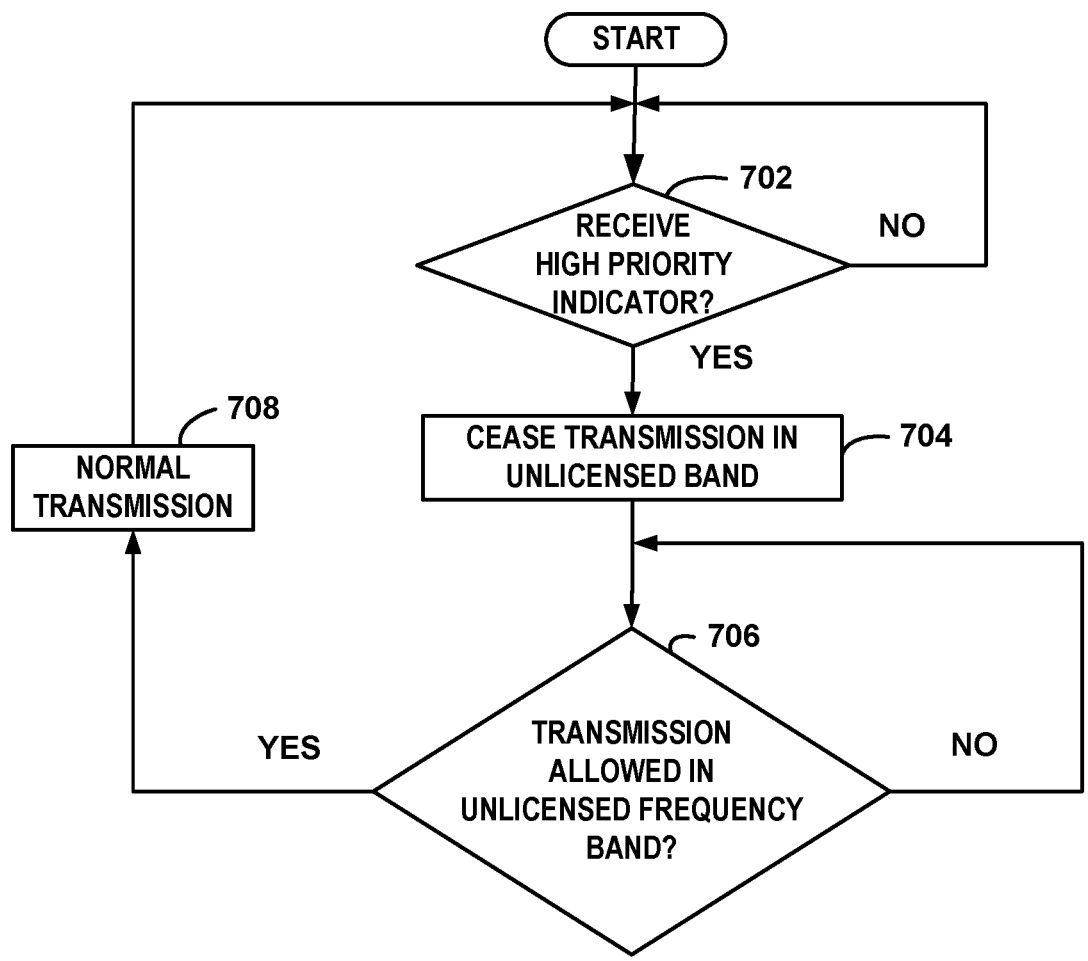
FIG. 7 is a flow chart of a method performed at an eNB for an example where a high priority indicator is received at the eNB.

FIG. 7 is a flow chart of a method performed at the eNB for an example where a high priority indicator 116 is received by the eNB. Therefore, for the example, the method is performed by an eNB such as the second eNB 104 discussed above.

At step 702, it is determined whether a high priority indicator 116 has been received. The eNB 104 monitors the licensed downlink channel for the high priority indicator message 500. If the high priority indicator 116 is received, the method continues at step 704. Otherwise, the eNB continues to monitor the licensed downlink channel.

At step 704, the eNB 104 stops any current transmission in the unlicensed frequency band and refrains from transmitting in the unlicensed frequency band. In situations where the high priority indicator message 500 includes information regarding the particular frequency band and/or channels, the eNB 104 refrains from transmitting only in the resources identified in the message 500.

At step 706, the eNB determines whether transmission is authorized in the unlicensed frequency band. In some situations, the determination is based on whether a new message has been received from the eNB 102 indicating that the unlicensed frequency band can be used. In other situations, the duration of the transmission ban is indicated in the high priority indicator message 500 and the eNB determines if the duration has elapsed. When the eNB 104 determines that transmission is allowed, a normal transmission schedule resumes at step 708. Therefore, when the transmission ban is determined to be concluded, the eNB 104 operates in accordance with the rules required in the band without additional restrictions.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A communication station comprising: a controller configured to: determine that a high priority communication is pending transmission to a user equipment (UE) device; determine that an unlicensed frequency band is in use; a licensed frequency band transmitter configured to transmit, in response to the controller, a high priority indicator within a licensed frequency band to at least another communication station, the high priority indicator indicating that the communication station has a high priority communication pending transmission; and unlicensed frequency band transmitter configured to transmit, in response to the controller determining that the unlicensed frequency band is not in use, the high priority communication over the unlicensed frequency band to the UE device, wherein the licensed frequency band transmitter is configured to transmit the high priority indicator within a downlink channel within the licensed frequency band.

2. A communication station comprising: a controller configured to: determine that a high priority communication is pending transmission to a user equipment (UE) device; determine that an unlicensed frequency band is in use; a licensed frequency band transmitter configured to transmit, in response to the controller, a high priority indicator within a licensed frequency band to at least another communication station, the high priority indicator indicating that the communication station has a high priority communication pending transmission; and unlicensed frequency band transmitter configured to transmit, in response to the controller determining that the unlicensed frequency band is not in use, the high priority communication over the unlicensed frequency band to the UE device, wherein the licensed frequency band transmitter is configured to transmit the high priority indicator within an uplink channel within the licensed frequency band.

3. A communication station comprising: a controller configured to: determine that a high priority communication is pending transmission to a user equipment (UE) device; determine that an unlicensed frequency band is in use; a licensed frequency band transmitter configured to transmit, in response to the controller, a high priority indicator within a licensed frequency band to at least another communication station, the high priority indicator indicating that the communication station has a high priority communication pending transmission; unlicensed frequency band transmitter configured to transmit, in response to the controller determining that the unlicensed frequency band is not in use, the high priority communication over the unlicensed frequency band to the UE device; a licensed frequency band receiver, the licensed frequency band transmitter and the licensed frequency band receiver configured to provide a primary cell (PCell) in accordance with at least one revision of The Third-Generation Partnership Project Long-Term Evolution (3GPP LTE) communication specification; and an unlicensed frequency band transmitter, the unlicensed frequency band transmitter configured to provide a secondary cell (SCell) in the unlicensed frequency band.

\* \* \* \* \*